US010336530B2

(12) United States Patent
Wilcox et al.

(10) Patent No.: US 10,336,530 B2
(45) Date of Patent: Jul. 2, 2019

(54) DISASSEMBLEABLE CHEESE CONTAINER WITH WRAP-AROUND INTERLOCK AND INCREASED FILL VOLUME

(71) Applicant: A.R. Arena Products, Inc., Rochester, NY (US)

(72) Inventors: Donald E. Wilcox, Rochester, NY (US); Charles S. Arena, Rochester, NY (US)

(73) Assignee: A.R. Arena Products, Inc., Rochester, NY (US)

( * ) Notice: Subject to any disclaimer, the term of this patent is extended or adjusted under 35 U.S.C. 154(b) by 150 days.

(21) Appl. No.: 14/920,098

(22) Filed: Oct. 22, 2015

(65) Prior Publication Data

US 2016/0039600 A1    Feb. 11, 2016

Related U.S. Application Data

(63) Continuation of application No. PCT/US2014/035584, filed on Apr. 25, 2014.
(Continued)

(51) Int. Cl.
*B65D 6/16* (2006.01)
*B65D 6/24* (2006.01)
(Continued)

(52) U.S. Cl.
CPC .............. *B65D 85/76* (2013.01); *A01J 25/13* (2013.01); *A01J 25/15* (2013.01); *B65D 7/24* (2013.01);
(Continued)

(58) Field of Classification Search
CPC . A01J 25/13; A01J 25/12; A01J 25/15; B65D 85/76; B65D 5/4279; B65D 81/245
(Continued)

(56) References Cited

U.S. PATENT DOCUMENTS 1,061,929 A    5/1913  Simon et al.
1,388,396 A    8/1921  Zeidler
(Continued)

FOREIGN PATENT DOCUMENTS

CA    747734      12/1966
CA    1087115    10/1980
(Continued)

OTHER PUBLICATIONS

Brochure for 640 Cheese Container, Buckhorn®, www.buckhorninc.com, Mar. 19, 2014.
(Continued)

*Primary Examiner* — Fenn C Mathew
*Assistant Examiner* — Jennifer Castriotta
(74) *Attorney, Agent, or Firm* — Bond, Schoeneck & King, PLLC; Jeffrey Powers (57) ABSTRACT

A disassembleable, reusable plastic container that can be used for the manufacture, storage and transportation of cheese products. The container may utilize wrap-around interlocks. The endwalls of the container may be flexible to allow the container to undergo minimal deformation when filled with cheese products. The container may also have a recessed pressboard that allows for increased capacity in the container. The container may also utilize positive corner interlocks that minimize unintentional disengagement.

7 Claims, 11 Drawing Sheets

Related U.S. Application Data (60) Provisional application No. 61/815,820, filed on Apr. 25, 2013.

(51) Int. Cl.
| | |
|---|---|
| *A01J 25/13* | (2006.01) |
| *A01J 25/15* | (2006.01) |
| *B65D 19/18* | (2006.01) |
| *B65D 81/24* | (2006.01) |
| *B65D 85/76* | (2006.01) |

(52) U.S. Cl.
CPC .......... *B65D 11/1866* (2013.01); *B65D 19/18* (2013.01); *B65D 81/245* (2013.01); *B65D 2519/00034* (2013.01); *B65D 2519/00069* (2013.01); *B65D 2519/00174* (2013.01); *B65D 2519/00208* (2013.01); *B65D 2519/00268* (2013.01); *B65D 2519/00288* (2013.01); *B65D 2519/00318* (2013.01); *B65D 2519/00338* (2013.01); *B65D 2519/00497* (2013.01); *B65D 2519/00587* (2013.01); *B65D 2519/00641* (2013.01); *B65D 2519/00711* (2013.01); *Y02W 30/807* (2015.05)

(58) Field of Classification Search
USPC .............................................. 426/130; 99/460
See application file for complete search history.

(56) References Cited

U.S. PATENT DOCUMENTS

| | | | |
|---|---|---|---|
| 1,464,651 A | 8/1923 | Frame | |
| 1,478,181 A | 12/1923 | Iwen | |
| 1,522,231 A | 1/1925 | Dorian | |
| 1,808,530 A | 6/1931 | Cooley | |
| 2,103,545 A | 12/1937 | Miollis | |
| 2,424,693 A | 7/1947 | Jones | |
| 2,520,183 A | 8/1950 | Toone | |
| RE23,489 E | 4/1952 | Toone | |
| 2,698,249 A | 12/1954 | Fisher | |
| 2,760,430 A | 8/1956 | Pauly | |
| 2,815,708 A | 12/1957 | Pauly | |
| 2,937,949 A | 5/1960 | Loevenbruck | |
| 2,982,661 A | 5/1961 | Thompson | |
| 3,100,712 A | 8/1963 | Meeker et al. | |
| 3,143,430 A | 8/1964 | Snow | |
| 3,623,651 A * | 11/1971 | Marcan ................... | B65D 1/225 |
| | | | 206/509 |
| 3,734,750 A | 5/1973 | Ludeman | |
| 3,797,980 A | 3/1974 | Budahn | |
| 3,969,995 A | 7/1976 | Krueger et al. | |
| 3,979,016 A | 9/1976 | Frater | |
| 3,985,258 A * | 10/1976 | Quigley ............. | B65D 11/1873 |
| | | | 217/43 A |
| 4,000,827 A * | 1/1977 | Emery ................ | B65D 11/1873 |
| | | | 217/13 |
| 4,049,838 A | 9/1977 | Krueger et al. | |
| 4,157,680 A | 6/1979 | Charles | |
| 4,234,615 A | 11/1980 | Krueger | |
| 4,263,330 A | 4/1981 | Streeter et al. | |
| 4,291,064 A | 9/1981 | Retzlaff | |
| 4,365,545 A | 12/1982 | Retzlaff | |
| 4,418,616 A | 12/1983 | Streeter et al. | |
| 4,456,142 A | 6/1984 | Burling | |
| 4,472,339 A | 9/1984 | van der Ploeg et al. | |
| 4,474,546 A | 10/1984 | Dekker | |
| 4,492,153 A | 1/1985 | Grabowski | |
| 4,504,497 A | 3/1985 | Kurth et al. | |
| RE32,232 E | 8/1986 | Bonerb et al. | |
| 4,610,885 A | 9/1986 | Tait | |
| 4,718,552 A | 1/1988 | Rossi et al. | |
| 4,811,658 A | 3/1989 | Brandsema et al. | |
| 4,874,621 A | 10/1989 | Loughrin | |
| 4,911,321 A | 3/1990 | Borchardt | |
| 4,917,255 A * | 4/1990 | Foy ...................... | B65D 25/005 |
| | | | 206/503 |
| 1,932,528 A | 6/1990 | Benno | |
| 4,969,567 A | 11/1990 | Rogers | |
| 5,024,146 A | 6/1991 | Dull | |
| 5,065,671 A | 11/1991 | Tameris | |
| 5,094,356 A | 3/1992 | Miller | |
| 5,227,079 A | 7/1993 | Tameris | |
| 5,243,900 A | 9/1993 | Pittelko | |
| 5,287,981 A | 2/1994 | Wheeler | |
| 5,360,263 A | 11/1994 | Nakano et al. | |
| 5,361,906 A | 11/1994 | Sterett | |
| 5,492,240 A | 2/1996 | Vilutis | |
| 5,520,934 A | 5/1996 | Meilleur | |
| 5,535,910 A | 7/1996 | Cassel | |
| 5,597,084 A | 1/1997 | Parasin | |
| 5,749,204 A | 5/1998 | Bokelmann et al. | |
| 5,816,425 A | 10/1998 | Keip et al. | |
| 5,921,171 A * | 7/1999 | Dreano ................ | A22C 7/0046 |
| | | | 100/194 |
| 6,465,033 B2 | 10/2002 | Menninga et al. | |
| 6,675,723 B2 * | 1/2004 | Sukeva ............... | B65D 11/1873 |
| | | | 108/55.1 |
| 7,320,409 B2 | 1/2008 | Stagnetto | |
| D588,328 S | 3/2009 | Strongin et al. | |
| 7,757,876 B1 | 7/2010 | Ditter | |
| 2004/0076673 A1 | 4/2004 | Bateman et al. | |
| 2006/0037883 A1 | 2/2006 | Stagnetto | |
| 2006/0175224 A1 | 8/2006 | Wilcox | |
| 2010/0239730 A1 | 9/2010 | Ditter | |
| 2014/0161932 A1 | 6/2014 | Kogioumtzis | |

FOREIGN PATENT DOCUMENTS

| | | |
|---|---|---|
| CA | 1094027 | 1/1981 |
| CA | 2071776 | 12/1992 |
| EP | 0071467 | 2/1983 |
| EP | 0071467 A2 | 2/1983 |
| EP | 0307049 | 3/1989 |
| GB | 218503 | 7/1924 |
| GB | 2291407 | 1/1996 |
| WO | WO2008/130227 | 10/2008 |
| WO | WO2014/176578 | 10/2014 |

OTHER PUBLICATIONS

Brochure for Pallecon 640 Bulk Cheese Box, CHEP Pallecon Solutions, Livonia, MI 48150 US, www.chep.com/pallecon, 2016.

* cited by examiner

PRIOR ART

PRIOR ART

PRIOR ART

BOTTOM CORED RUNNER

Fig. 11A
PRIOR ART

SIDE CORED RUNNER

Fig. 11B

COUPLING TYPES

SHORT COUPLING

A/B = % of distance to corner

LONG COUPLING

A/B = % of distance to corner

Fig. 12

DISASSEMBLEABLE CHEESE CONTAINER WITH WRAP-AROUND INTERLOCK AND INCREASED FILL VOLUME

CROSS-REFERENCE TO PRIORITY APPLICATION

This application claims priority under 35 U.S.C. § 120 and § 365(c) as a continuation of International Patent Application No. PCT/US2014/035584 filed Apr. 25, 2014, which application claims priority to U.S. Provisional Application No. 61/815,820 filed Apr. 25, 2013, which applications are hereby expressly incorporated by reference in their entirety.

BACKGROUND

1. Technical Field

Containers that can be reused and that are suitable for the manufacturing, production, storage and transportation of cheese products.

2. Background

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Cheese is made within block-shaped containers that are also used to ship or otherwise transport and store the cheese for further processing. Some of the containers are made of stainless steel with permanently joined sides, others are made with plywood sides that are temporarily held together between metal components by banding or stretch wrap, while still others are made of plastic resin material and held together with interlocking corners without the need for horizontal banding or stretch wrap. These containers have approximately 18,000 cubic inches (i.e., 295 liters) of capacity for making blocks of cheese weighing about 700 pounds (or about 315 kilograms).

The sides of the containers are assembled together to constitute a so-called "cheese hoop," which is used independent of a pallet or base and cover (also referred to as a "lid") of the containers during the cheese-making process. In the direct-fill process, the cheese is pressed from both ends of the hoop, sometimes in the presence of a vacuum, to remove whey and air from the coagulated part of the cheese, knitting cheese curds into a cohesive block. The compression of the cheese exerts large outward pressures against the cheese hoops, and the sides and joints between the sides of the cheese hoops must be especially strong to resist these pressures.

Finished cheese is extruded in large blocks from the stainless steel containers for further processing, whereas the sides of the plywood containers and plastic containers can be taken apart to remove the blocks of cheese. Once removed from the containers, the blocks of cheese are further processed by forcing the blocks through a matrix of wire cutters for cutting the blocks into a number of smaller blocks which are often of exact weights for consumer sizes. Any variation from the block's targeted dimensions, squareness and flatness, such as bowing or denting, produces waste that is trimmed from the exterior of the blocks. Trim scrap is repurposed for use in making processed cheese or shredded cheese, adding to handling costs and often reducing the market value of the cheese and overall profitability.

Accordingly, the cheese containers must be made to exacting tolerances and be especially rigid. In fact, the containers are generally required to hold dimensions of the finished cheese blocks to within ⅛th of an inch (or approximately 3 millimeters). However, the stainless steel containers tend to become dented with repeated use and produce increasing amounts of scrap. The dents also make extruding the blocks of cheese from the stainless steel containers more difficult. Stainless steel cheese containers have the additional disadvantages of high initial cost; high weight, increasing freight costs; and the inability to be dissembled for cost-effective return shipping of empties. For these reasons, the use of stainless steel cheese containers is limited to a small number of in-plant operations.

The plywood and metal containers have a much lower initial cost than the stainless steel containers and resist denting; but the plywood poses sanitation problems associated with the wood porosity and splinters, as well as rust and paint from the painted carbon steel frames. Plywood containers are also difficult to assemble due the large number of components (8 to 12 components per container) and the need for horizontal banding or stretch wrap to hold hoops together. The plywood is stripped and re-waxed between uses for sanitary reasons, while metal components are stripped of wax and paint, repaired, repainted and rewaxed before the containers can be used again to make cheese. This is both a costly process and a process with substantial negative impact on the environment in terms of solid waste and energy consumption, as well as greenhouse gas and other emissions.

Plastic cheese containers, such as those described in U.S. Pat. No. 5,287,981, have substantial advantages over stainless steel and plywood containers. For example, plastic cheese containers, made of food grade materials, can easily be washed between uses in a process that is less costly, less energy intensive and reduces solid waste, greenhouse gas and other emissions relative to the wood and metal container reconditioning process. Plastic cheese containers are also easier to assemble, with fewer components (6 components per container) and eliminate the need for horizontal banding or stretch wrap to hold the hoops together, further reducing cost and solid waste. Plastic cheese containers are much lighter than plywood containers (about 95 lbs. for plastic vs. 110 to 120 lbs. for plywood), reducing freights costs by permitting 1 or 2 more containers full of cheese to be shipped on over-the-road trailers, from 54 plywood containers full of cheese per trailer to up to 56 plastic containers per trailer, without exceeding weight limits. This weight reduction further reduces return freight costs by allowing more empty, disassembled containers to be shipped per trailer loads—from about 360 to 400 for wood to about 450 to 475 for plastic containers.

Plastic cheese containers, as described in U.S. Pat. No. 5,287,981, have grown in market share since introduction. However, they have certain attributes that can be improved upon to further benefit the market. These improvements are the subject of this invention. Existing plastic cheese containers interlock in corners using male interlock elements referred to as tenons, lugs, fingers or hooks protruding off the end faces of one set of opposing walls, and a second set of opposing walls providing female interlocking elements referred to as mortises or hook receivers. Male interlocking tenons or hooks extend into female interlocking mortises or hook receivers, then adjacent walls move in opposite directions along the vertical axis to lock in place, forming an interlock that restricts rotation around the vertical axis of each corner (a non-rotational interlock). Corners are locked and held in place as a result of friction and interferences between the tenons or hooks and mortises or hook receivers. These joints have the added feature of all locking elements remaining within the plane of the inner and outer surfaces of each pair of adjoining walls. This style of joint, while effectively resisting rotation around the vertical axis of each corner to help minimize deflection in the walls and maintain cheese block flatness, results in high stresses in the joint. The friction or interference fit does not provide a positive lock. The friction/interference fit also necessitates the use of tooling to assemble and disassemble the interlocks.

Another element common in the current state of the art of plastic cheese containers is that narrower endwalls have substantially greater resistance to deflection than wider sidewalls. This discrepancy in stiffness has the unintended consequence of rotating fixed corners toward the endwalls and away from the sidewalls, further increasing deflection of sidewalls.

All cheese containers incorporate an additional set of components referred to as a pressboard and springs (referred to by some as a "spring plate"). Pressboards are placed on top of the block of cheese after it is formed, but before the cover is attached. Springs of varying configuration are then placed on the pressboard and the cover is placed on the springs. Cheese containers are closed by pressing down on the cover to compress springs against the pressboard and then banded in place. This spring and pressboard assembly maintains pressure on the cheese and travels down into the hoop to take up space vacated by further loss of whey and closing of air gaps as the cheese is cooled, and aged during storage and shipment. This improves the homogeneity and quality of the cheese. In existing cheese containers the pressboard and springs reduce the volume available in the container by at least the thickness of the pressboard and the fully compressed springs, often by over ½ inches.

All cheese containers include a pallet or base, in addition to the 4-sided hoop, pressboard, springs and a cover for fork truck and pallet jack handling and stacking. Pallets of existing plastic cheese containers have legs, feet or runners that are formed from the bottom using various forms of the injection molding process. That common design allows pallets to be formed in one piece with a solid top surface to support the cheese and no secondary assembly, closed cavities or seams that can increase manufacturing costs and make pallets more difficult to clean. That design includes ribs forming the sides of the feet sitting on the floor. Said ribs can develop burrs when pallets are slid on the floor, catch on imperfections in the floor, wear down with use, and sustain damage. That design presents the further problem of increased pallet weight due to the need for the walls of the feet to be tapered for removal from the mold resulting in very thick sections at the top of the feet in order to achieve adequate thickness at the bottom of the feet to resist damage.

SUMMARY

A novel design for a disassembleable cheese container has been developed that can solve the problems associated with conventional containers. The novel design elements can provide improvements in terms of strength, durability, weight reduction, ease of assembly and disassembly, reduction of inadvertent disengagement, shape-retention, and/or increased capacity for the cheese container.

The novel design of the disassembleable container is made of a resin or plastic material for making, storing, and transporting cheese. The container requires minimal refurbishing between uses, forms cheese to exacting dimensions, and can be assembled with improved speed and accuracy.

An exemplary embodiment includes a disassembleable container that has a plurality of sidewalls and a plurality of endwalls, where the container uses an interlock to secure a sidewall to an endwall, and the interlock wraps around the corner where the sidewall and endwall meet to lock along the sidewall or endwall, away from the corner.

Another exemplary embodiment includes a disassembleable container usable for storing and transporting cheese, where the container has two sidewalls and two endwalls, and the width of the endwalls is less than the width of the sidewalls. In addition, the center of each endwall is more flexible than the edges of the endwall, so that when the container is under internal pressure from its contents, the endwalls bow outward and the corners of the container deflect up to about 33% less than those of conventional containers having rigid endwalls.

Figure 12:
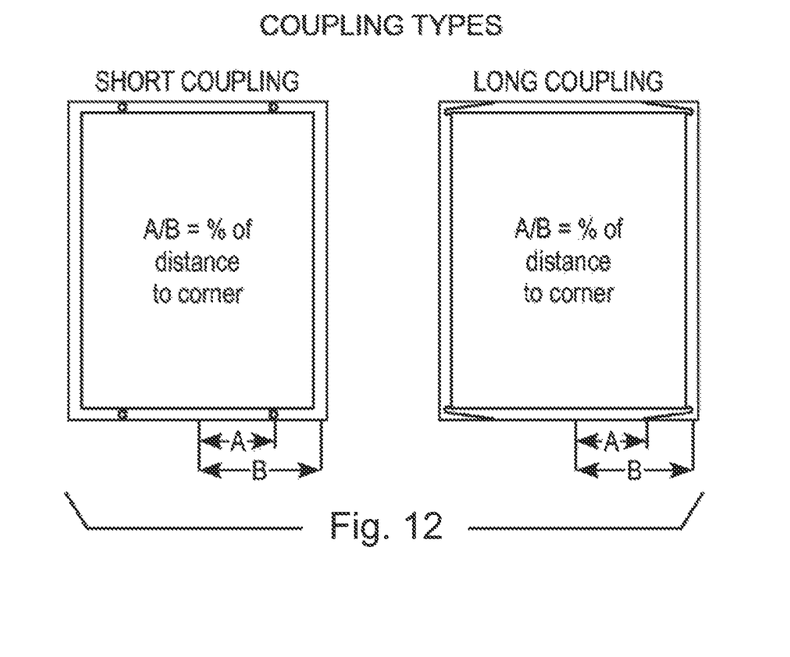
FIG. 12 depicts an exemplary short and long coupling.

Another exemplary embodiment includes a disassembleable container usable for storing and transporting cheese that has a plurality of walls meeting at a plurality of corners, where one or more of the corners are formed in a single piece, without any joint at the corner. When the container is under internal pressure from its contents, the corners of the container deflect up to about 90% less than those of conventional containers having jointed or multi-piece corners. An exemplary embodiment can include a long coupling or a short coupling. A long coupling begins at the intersection of two walls and extends beyond at least one of the two walls or both. A short coupling is located along one of the walls and does not extend to the corner. See FIG. 12.

Another exemplary embodiment includes a disassembleable container usable for storing and transporting cheese that has a plurality of sidewalls, a plurality of endwalls, a pressboard, and a lid, where the pressboard can be recessed, in whole or in part, in the lid.

Another exemplary embodiment includes a disassembleable container usable for storing and transporting cheese that has a plurality of sidewalls and a plurality of endwalls, wherein one or more positive locks are used to prevent or substantially inhibit and/or reduce unintended disengagement of the sidewall and endwall couplings.

Another exemplary embodiment includes a disassembleable container usable for storing and transporting cheese, where the container has two sidewalls and two endwalls, and the width of the endwalls is less than the width of the sidewalls. The corners where each sidewall meets each endwall are reinforced to make them more rigid, such that when the container is under internal pressure from its contents, the corners of the container deflect up to about 33% less than those of conventional containers having less rigid corners.

Another exemplary embodiment includes a base of a disassembleable container, where the base has two runners that are horizontally cored and that has a rib pattern in the runners that are cored.

Exemplary embodiments also include methods of making the exemplary containers described herein including the various exemplified combinations of features.

Exemplary embodiments also include methods of making the bases of containers described in the above exemplary embodiments.

Exemplary embodiments also include methods of making, storing, packing and/or transporting cheese using the containers described in the above exemplary embodiments.

DRAWINGS—REFERENCE NUMERALS

1 Pallet Base
2 Sidewall
3 Endwall
4 Press Board
5 Springs
6 Cover
7 Wrap Around Interlock
8 Wrap Around Corner Interlock Stresses
9 Conventional Corner Interlock Stresses
10 Positive locks
11 Side cored runners
12 Surface Area in contact with the floor on a preferred embodiment
13 Surface Area in contact with the floor on a conventional runner
14 "L" Configuration
15 Bottom Cored Runner and foot
16 Side cored Runner and foot

DETAILED DESCRIPTION

Figure 1:
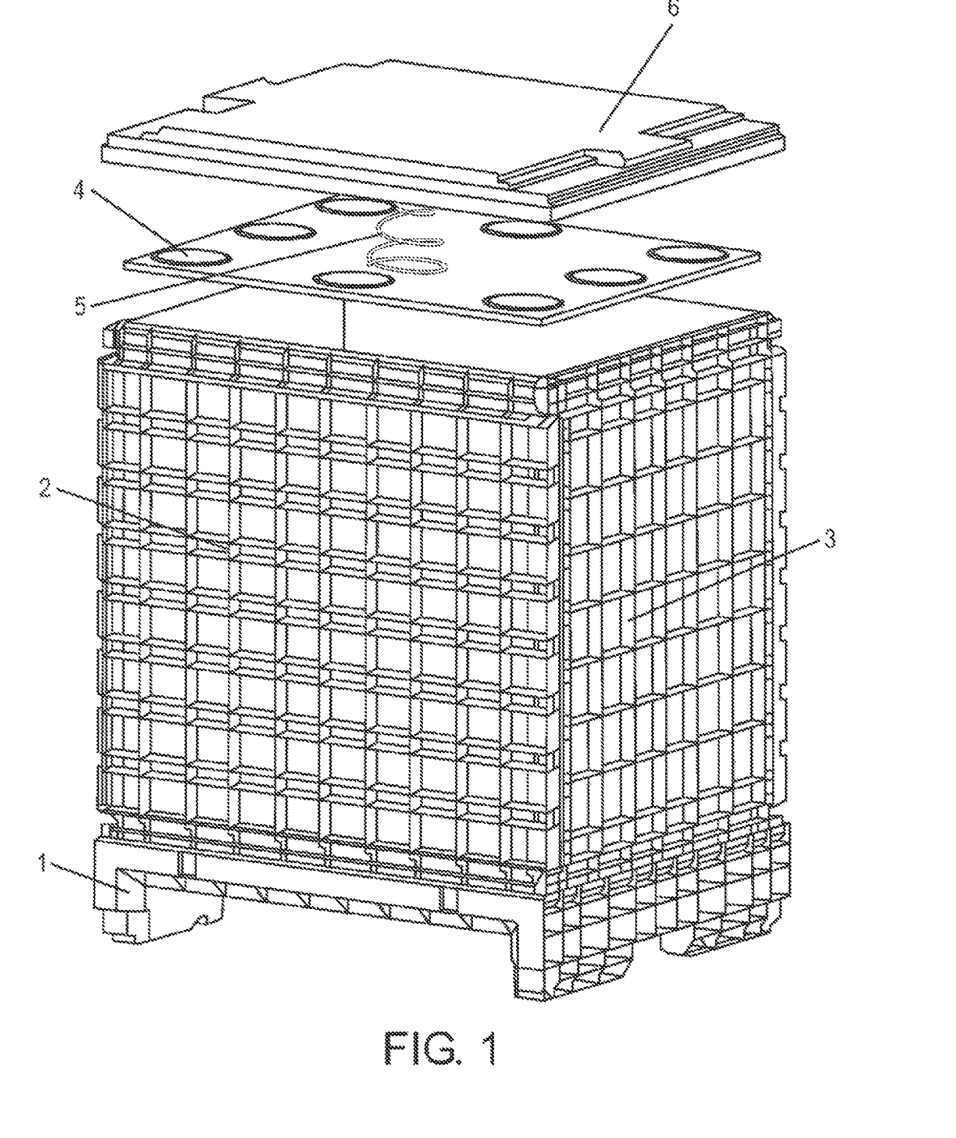
FIG. 1 is an exploded isometric view of a disassemblable container in accordance with an exemplary embodiment.

An exemplary embodiment is depicted in FIG. 1 as a disassembleable container for the storage and transport of cheese. The container is fully assembled or erected to include a base 1 that extends in a horizontal plane, four interlocking wall panels—two sidewalls 2 and two endwalls 3—that extend in respective vertical planes, and a cover 6 that also extends in the horizontal plane.

The container is molded from a plastic or resin material, such as, for example, polypropylene, acrylonitrile butadiene styrene (ABS), a resin or thermoplastic polymer, or combination thereof. The container has an exterior ribbed construction which adds rigidity to the panels, reduces their weight relative to their strength, and helps to radiate heat produced during the cheese-making process over a much larger area of the container's exterior. The inner faces of base 1 and walls 2, 3 are smooth or substantially smooth to avoid making any imprints in the cheese.

Figure 9:
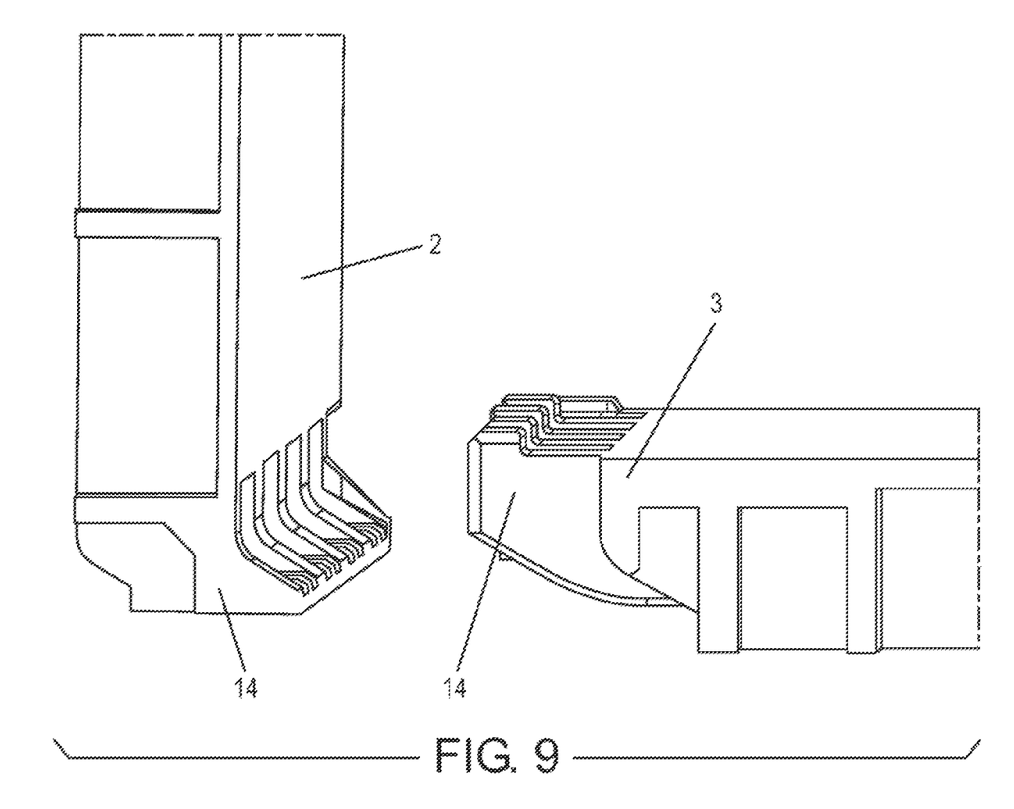
FIG. 9 depicts an exploded cross sectional view of the "L" configuration of an exemplary sidewall and endwall.
Figure 10:
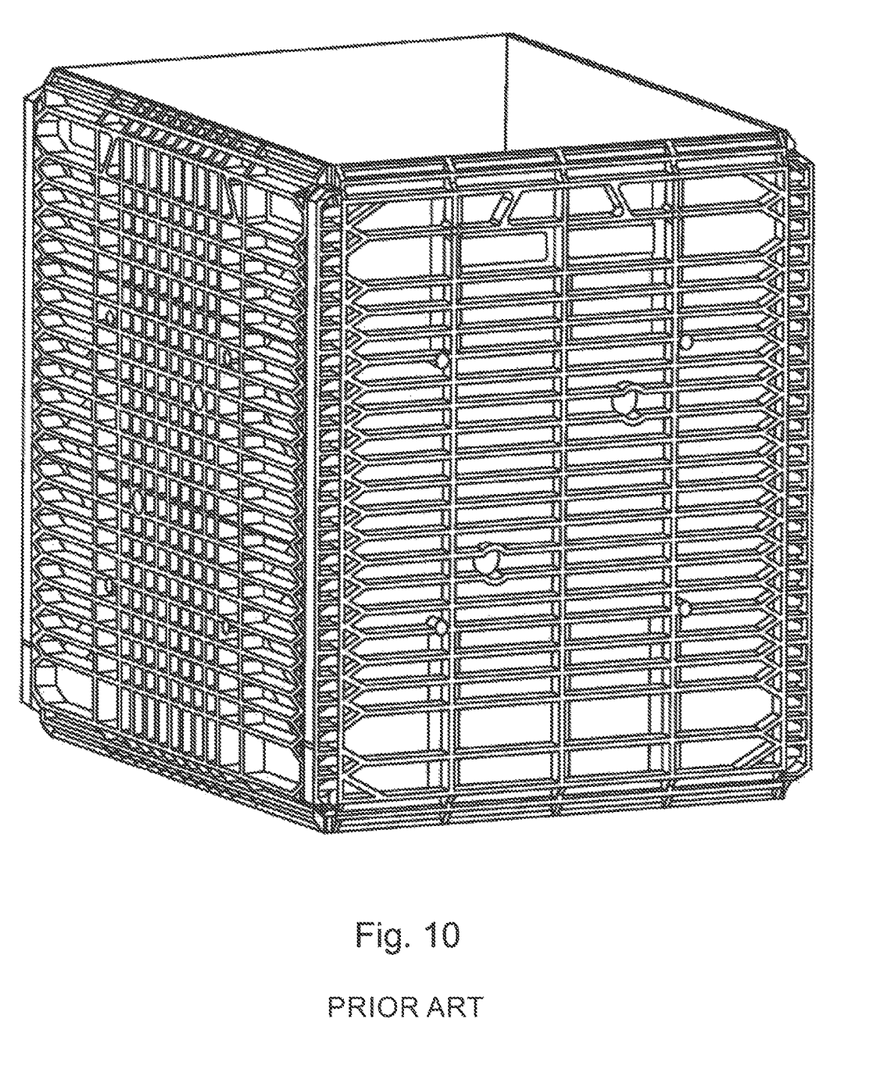
FIG. 10 depicts an isometric view of a conventional disassembleable hoop (e.g. sidewall and endwall).

Exemplary embodiments of the novel design can include one or more of these features:

Non-Rotational Wrap-Around Interlock—The current practice for connecting two walls in the corner of a disassembleable container is to provide an interlock in the area where the two flat walls intersect. This is also the current practice for cheese container walls, which are flat and are connected by features on the edges of the walls. FIG. 10 depicts the flat walls and edge connections of a conventional disassembleable hoop. In contrast, a wrap-around interlock utilizes space on either side of this, but within the envelope of the adjoining walls. To achieve this increased joint area, one or both of the adjoining walls wraps around the corner. This results in walls that are "L" shaped on the ends. FIG. 9 depicts the "L" configuration 14 of the walls.

Figure 2:
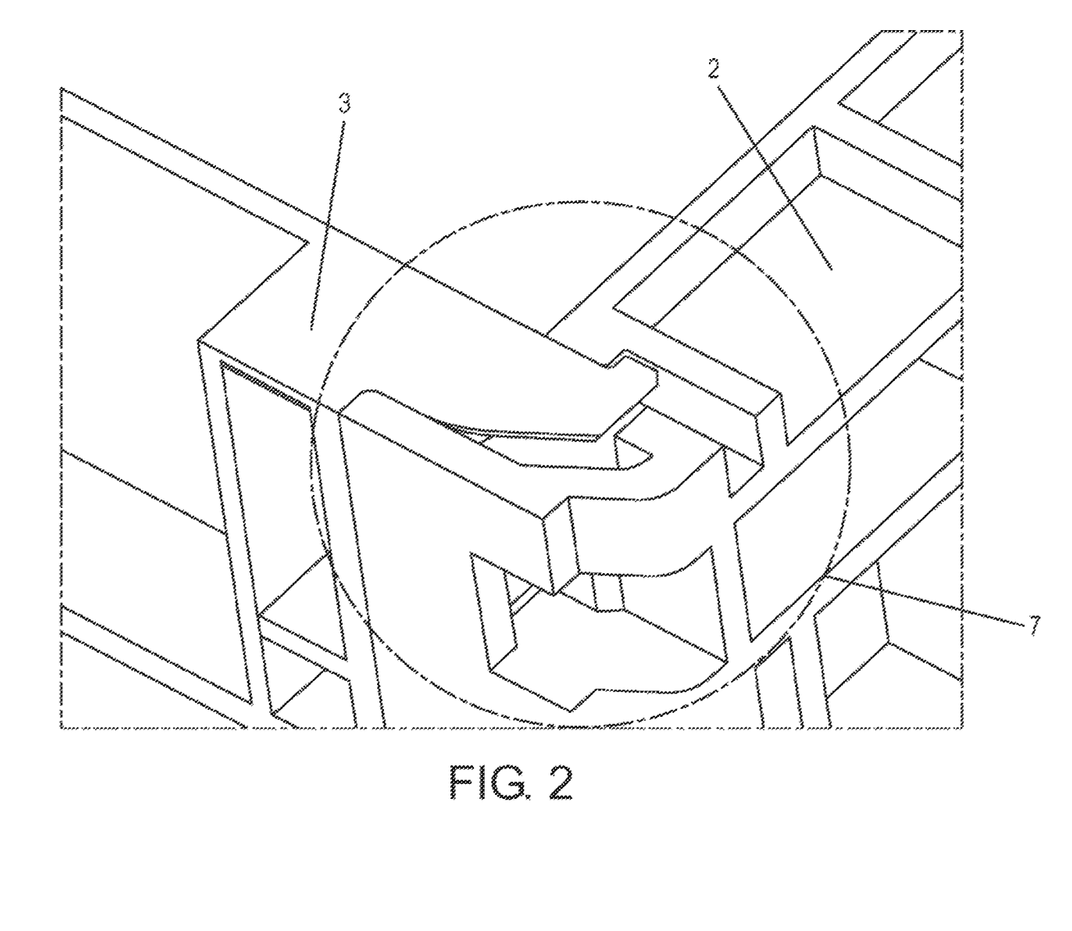
FIG. 2 depicts a cross sectional view of the wrap-around interlock of an exemplary embodiment connecting an endwall and a sidewall.
Figure 3A:
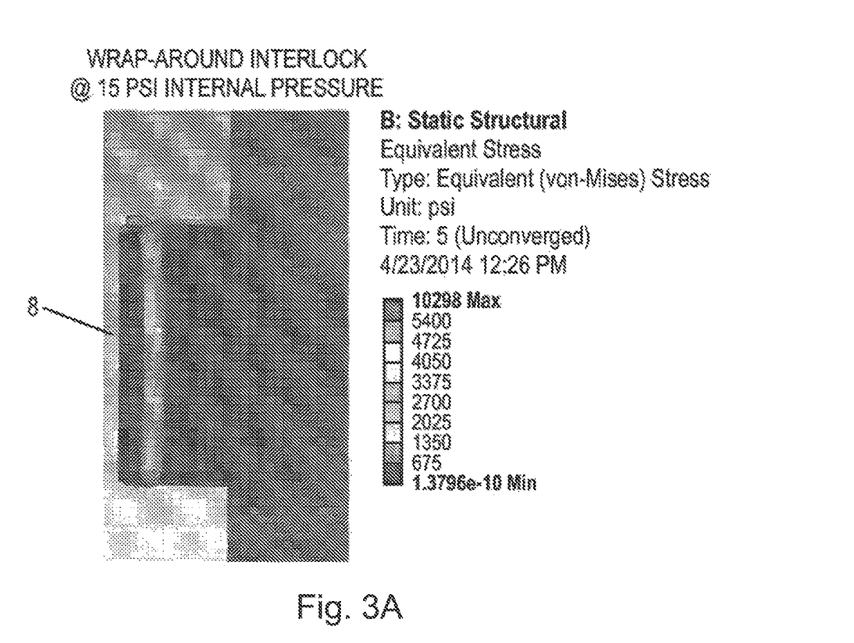
FIG. 3A depicts a finite element stress analysis of a wrap-around interlock according to aspects of the present invention.
Figure 3B:
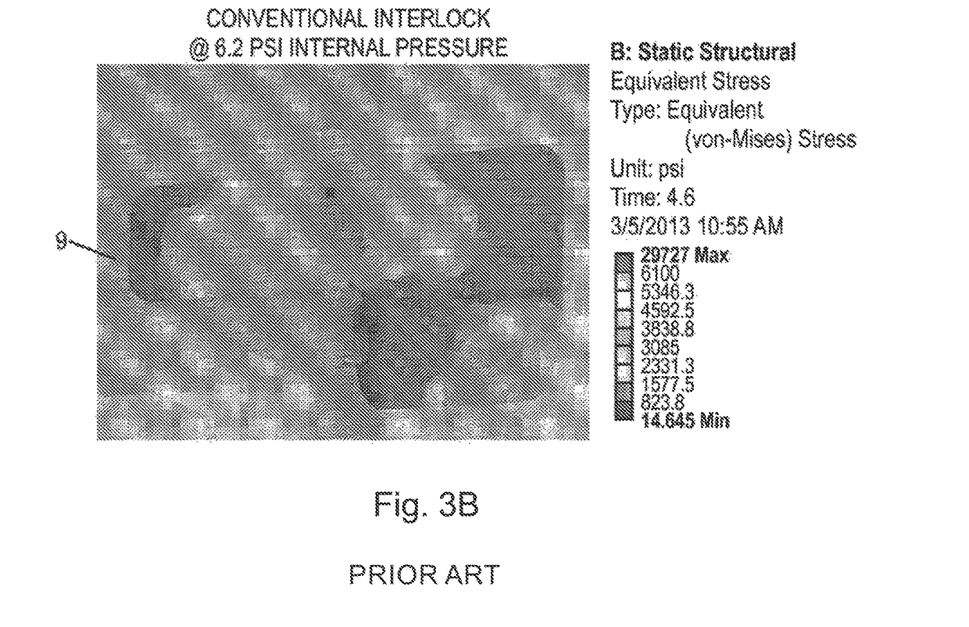
FIG. 3B depicts a finite element stress analysis of a conventional interlock.

In an exemplary embodiment, the container utilizes an interlock 7 that wraps around the corner of the container. (See FIG. 2.) The interlock must resist rotation around the vertical axis of each corner to minimize wall deflection (a non-rotational interlock) and withstand forces of about 3 psi to about 5 psi, such as, for example, about 4 psi, the pressure required to form a solid block of cheese from cheese curd. When a rectangular object is pressurized from the inside, its shape tends toward a circle. The pressure will tend to bend the corners wider (to a more obtuse angle); (2) bend the center of the sides outward; and (3) exert a comparatively lower stress in the neutral area between the corners and centers of the sides than at the corners or centers of the sides. The novel wrap-around design allows the interlock 7 to be positioned away from the corner where there are high bending stresses. The stress can be reduced by about 10%, by about 20%, by about 30%, by about 40%, or by about 50% by positioning the coupling less than about 50% to about 70%, such as, for example, less than about 60% of the distance from the center of the endwall 3 to the corner. As shown in FIG. 3, the wrap-around corner interlock stresses 8 are significantly lower than the conventional corner interlock stresses 9. Alternatively, stresses 8 can remain in a similar range and less material can be used to construct sidewalls 2 and endwalls 3 resulting in weight and cost reduction.

A conventional cheese container is normally opened by lifting one of the walls to disengage the interlock in the corner. To accomplish this sliding action, the frictional force in the interlocks must be overcome.

The novel wrap-around interlock 7 improves the ease of opening the cheese container. The disengagement force can be reduced by about 10%, by about 20%, by about 30%, by about 40%, or by about 50%, by positioning the coupling less than about 60% to about 80%, such as, for example, less than about 75% of the distance from the center of the endwall 3 to the corner. The preferred embodiment requires about 30% to about 60% less, such as about 50% less force to disengage the lock than that required for disengagement of conventional interlocks.

More Rigid Corner—In an exemplary embodiment, the corner is formed in a single piece, reducing the compliance that would be required by the contact of two pieces. In addition, the absence of a joint in the corner allows more room for structural members. Finally, since no interlocking geometry of multiple pieces needs to be formed at the corner, this allows for a continuous plate to wrap around or substantially around the perimeter of the corner, as shown in FIG. 2.

The use of the novel non-rotational wrap-around interlock 7 can result in less wall deflection and/or reduced part weight and cost. When a short coupling is used, the corner is formed from one part resulting in a rigid corner. The closer to the center of the sidewall the coupling is placed, the lower the wall deflection. The wall deflection can be reduced by about 20%, by about 40%, by about 60%, by about 80%, or by about 90%. The block of cheese removed from the cheese container is cut with wires into smaller sizes for sale. Any deviation from a square block will cause trim scrap on the sides, often resulting in increased handling and a lower price for the cheese sold into processed or shredded cheese markets. With the wrap-around interlock 7, a single wall spans the corner, with no need to provide space for engaging the adjacent wall. This allows for a substantially squarer or flatter block of cheese.

Enhanced Endwall Compliance—In an exemplary embodiment, the novel design brings less overall wall deflection through increased endwall compliance, resulting in a substantially squarer or flatter block of cheese.

Walls for a cheese containers are customarily designed to be rigid to minimize the deflection caused by the cheese making process and from the weight of the cheese, with the goal of yielding a square block of cheese. Contrary to the common design practice, a non-intuitive approach was utilized to achieve this goal.

Cheese blocks are rectangular with two long sides (each about 28") and two short sides (each about 22"). The long walls of the cheese container tend to deflect more under pressure from the weight of the cheese. Since the corners of the cheese container are designed to be rigid, the deflection of the long walls outward tends to rotate the corners toward the long walls. This results in rotating the short walls inward.

Instead of making the short walls more rigid (the common wisdom), the novel design makes the short walls more flexible in the center. More flexible can mean that there are fewer ribs (see FIG. 1, element 3). If the short walls are more flexible in the center, then they will tend to bow outward. As the short walls bow outward, they rotate the rigid corner back. This in turn forces the long wall inward, reducing the maximum deflection and resulting in enhanced endwall compliance.

This enhanced endwall compliance results in improved cheese block squareness and flatness. By tuning the stiffness of the short wall to the long wall, the minimum cheese container deflection can be achieved, and the cheese container (along with the cheese it contains) will achieve improved squareness up to about 10%, about 20%, or about 30%.

The novel design also results in reduced short wall weight and cost. Because the short wall can be less rigid, it requires fewer ribs as structural support. This means less material is needed, there is less weight to the container, and material costs are reduced.

More Positive Interlocks—In an exemplary embodiment, the novel design includes additional positive corner interlocks 10 when compared to common cheese containers in use. See FIG. 4. These additional interlocks 10 will aid in preventing unintended disengagement.

Figure 4:
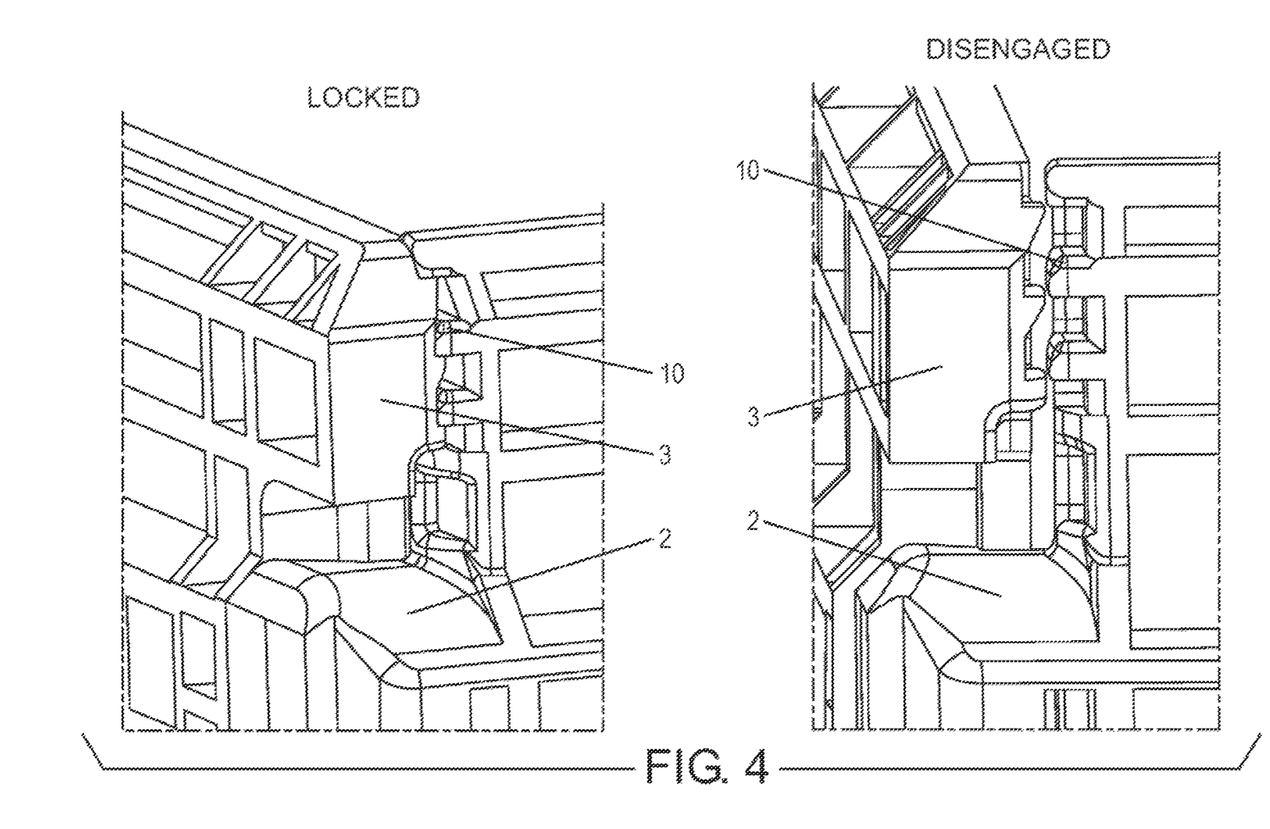
FIG. 4 depicts an isometric view of the positive lock in a wrap-around interlock connecting a sidewall and an endwall in engaged and disengaged configurations.

Conventional molded cheese containers use a friction fit or detent to prevent disengagement. Such friction fits and detents do not provide a positive lock to prevent disengagement in some handling conditions. The novel design utilizes a positive lock 10 that only disengages when intended.

Recessed Pressboard—In an exemplary embodiment, the novel design results in increased fill volume by permitting the pressboard 4 used in the container to move into the cover 6, thereby allowing more material to be contained.

Conventional cheese containers have an interior size of 22" wide×28" long×30" high. The interior of a container is filled with cheese. A pressboard (usually about ½" thick) is placed on top of the cheese along with several compression springs. The springs are held compressed by a cover that is held down with banding. As the cheese cools and ages, the springs press the pressboard downwards, resulting in a block of cheese 28+" tall.

Some cheese customers desire a higher fill volume for each container. The current equipment for making cheese is designed to accommodate a 30" tall cheese box. For this reason, a taller cheese container is not practical. Instead of increasing the height of the container, the novel design utilizes a cover 6 that provides a ~½" recess to accept the pressboard. The recess in the cover 6 allows the bottom surface of the press board 4 to travel to the top of the 30" hoop.

Figure 5:
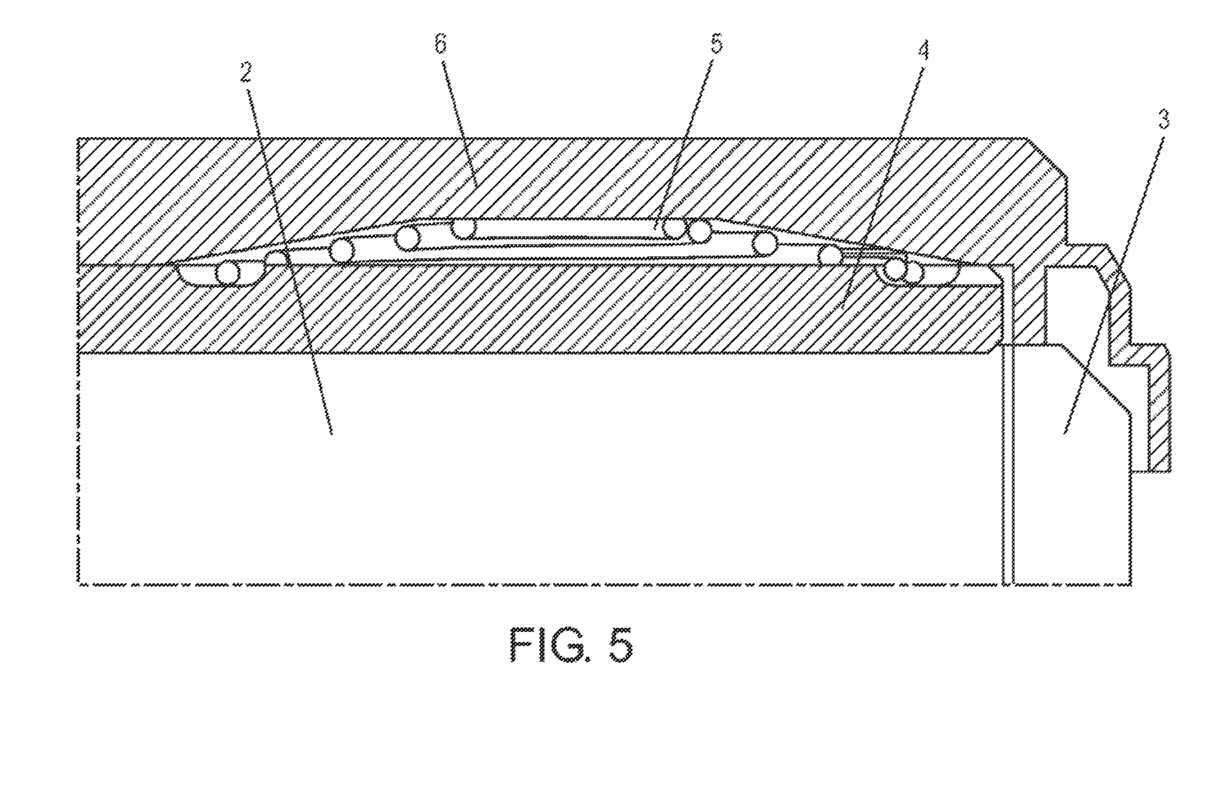
FIG. 5 depicts a cross section view of the cover, recessed press board, spring and walls.

The primary benefit of the recessed pressboard 4 is the capacity for increased fill volume in the container. As depicted in FIG. 5, since the pressboard 4 pushes against the springs 5 to recess about ½" into the cover 6, the cheese fill volume per container can be increased by ~308 cubic inches, which equates to an increase of approximately 12.5 pounds of cheese per container, which results in a lower cost of containerization per pound of cheese.

Industry Best Block Flatness—In an exemplary embodiment, due to the enhanced endwall compliance as noted above, there is less bowing up to about 10%, about 20%, or about 30% less than occurs in conventional containers. As a result, the cheese contained as a block within the container has industry-best block flatness. This results in efficiency and savings, since the block of cheese removed from the container will have a higher degree of squareness and flatness, which reduces the need to trim and repurpose cheese from the exterior of the block.

Figure 6:
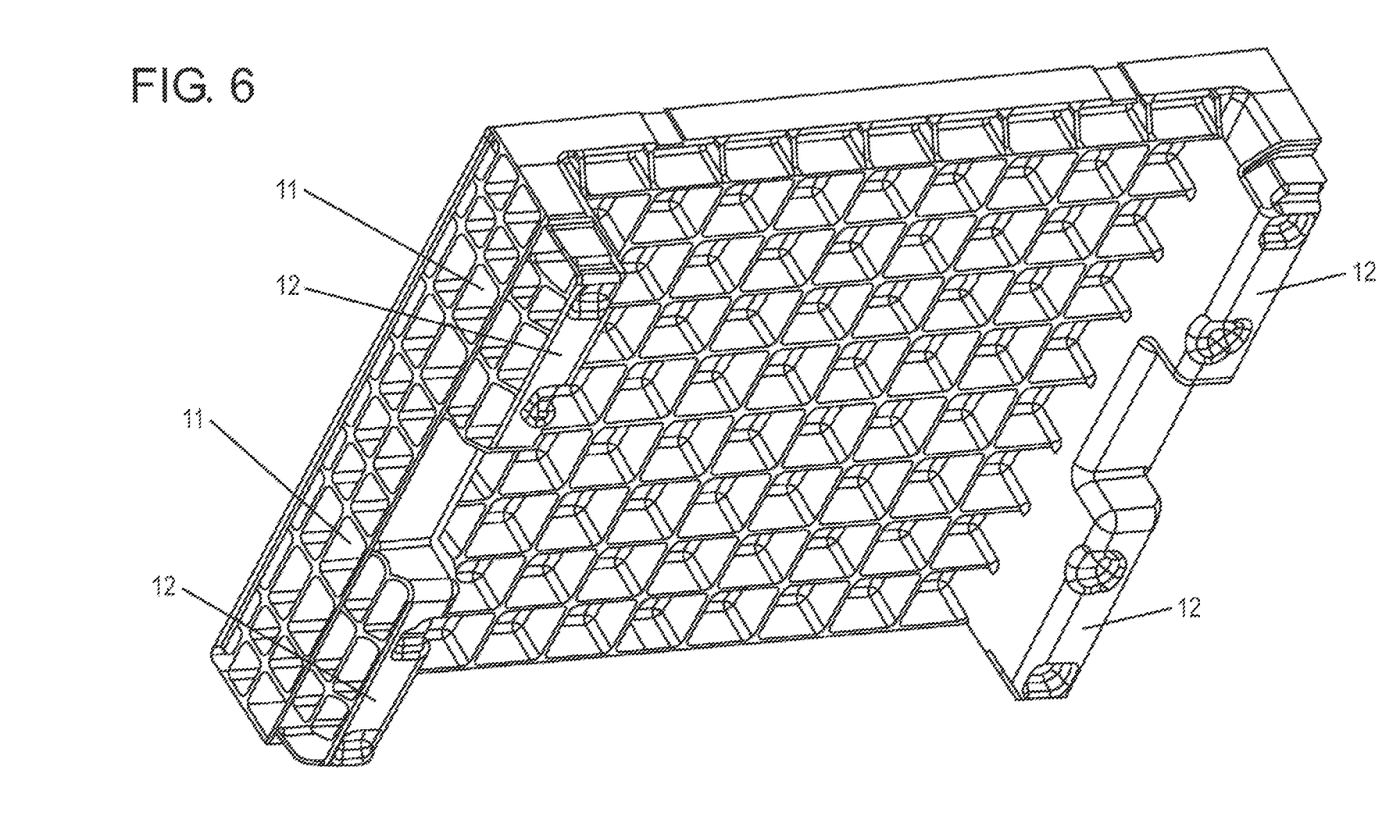
FIG. 6 depicts an isometric view of the pallet base.
Figure 7:
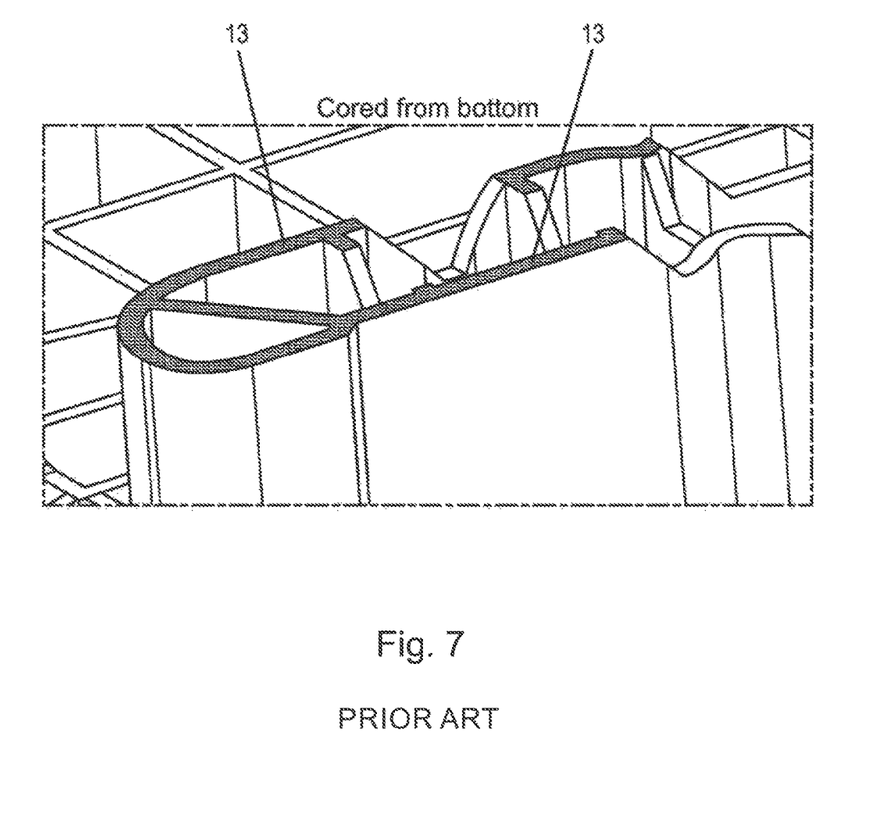
FIG. 7 depicts an isometric view of the foot of a conventional base.
Figure 8:
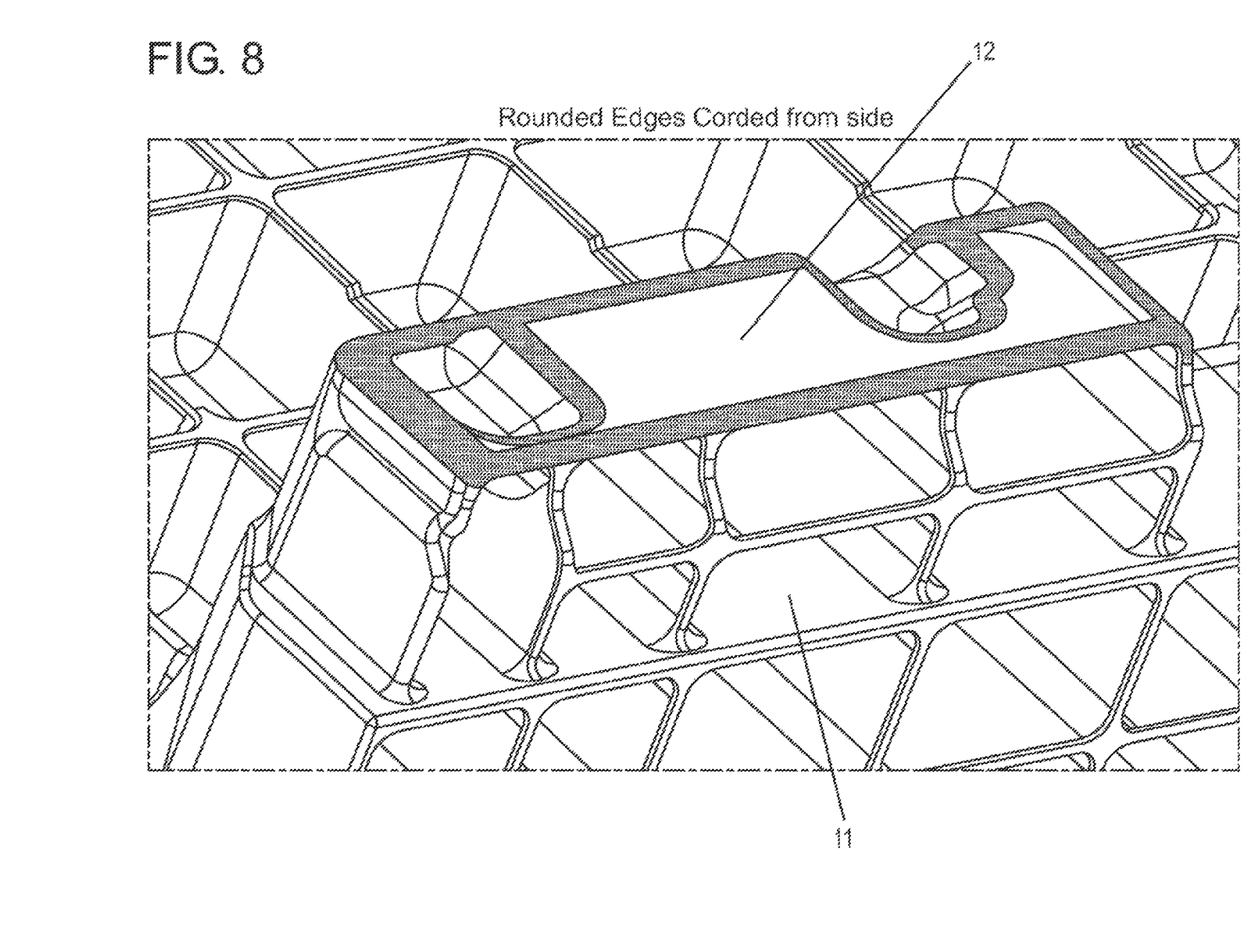
FIG. 8 depicts an isometric view of the foot of the exemplary base with horizontal (side) coring and rounded edges highlighted.
Figure 11A:
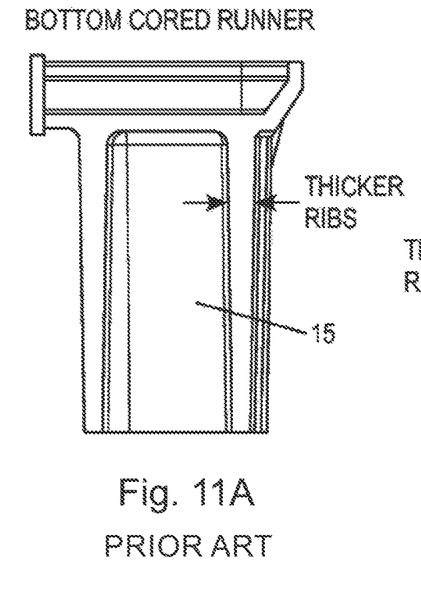
FIG. 11A depicts a cross section view of a bottom: cored runner and foot.
Figure 11B:
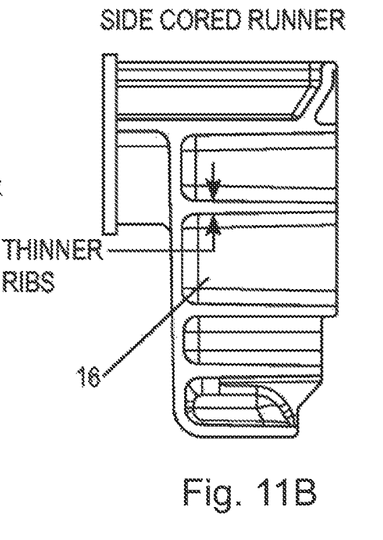
FIG. 11B depicts a cross section view of a side cored runner and foot.

Pallet Runners Cored from the Side—In an exemplary embodiment, the pallet base 1 of the container is horizontally cored in the area comprising the feet of the base. The horizontal coring of the runners 11 of the base which comprises the feet, creates ribs which provides strength to the pallet base. See FIGS. 6-8. Conventional containers use pallet bases cored vertically from the bottom. Vertical coring from the bottom creates ribs which are in contact with the floor and are thus subject to damage. Also, only a small amount of surface area 13 is in contact with the floor. FIG. 11 depicts a cross section view of a bottom cored runner and foot 15 and a side cored runner and foot 16, showing that the bottom cored runner and foot 15 has thicker ribs and less material in contact with the floor than the side cored runner and foot 16. The exemplary pallet base 1, horizontally cored, eliminates ribs in contact with the floor and increases the surface area in contact with the floor. The added material in contact with the surface 12 below will result in less wear and scraping by the feet. In an exemplary embodiment, short distance coring is employed to create core depths of minimal distance. Minimizing the depth of the cores facilitates minimizing of the effect of draft on the rib thickness, resulting in a significant weight savings, while at the same time maintaining the strength of the section. In an exemplary embodiment, the cored base has a surface area in contact with the floor that is about 20% to about 400% greater (such as, for example, about 20% greater, about 40% greater, about 60% greater, about 80% greater, about 100% greater, about 120% greater, about 140% greater, about 160% greater, about 180% greater, about 200% greater, about 220% greater, about 240% greater, about 260% greater, about 280% greater, about 300% greater, about 320% greater, about 340% greater, about 360% greater, about 380% greater and about 400% greater) than the surface area that would be contacting the floor if the base were not cored. A preferred embodiment has a surface area about 400% greater than the surface area that would be contacting the floor if the base were not cored. In addition, in an exemplary embodiment, the weight of the cored base is about 10% to about 50% less (such, for example, about 10% less, about 20% less, about 30% less, about 40% less or about 50% less) than the weight of the base if it were not cored. A preferred embodiment has the weight of the base being about 20% less than the weight of the base if it were not cored.

Weight Reduction—As a result of: (1) the increased stiffness and strength to weight of the non-rotational wrap around corner, (2) making the endwalls 3 less stiff to reduce sidewall deflection and (3) coring pallet runners from the sides to reduce weight, this novel design will be approximately 14 pounds (or possibly about 10 pounds to about 15 pounds lighter) lighter than an existing container of comparable size. The lighter weight allows shipment of one additional container full of cheese per truck, resulting in freight cost savings. Alternatively, the lighter weight (approximately 14 pounds less) and greater capacity (approximately 12.5 lb. more of cheese) allows shipping/transport of more cheese in the same number of containers while having a reduced overall payload and consequently reduced shipping cost per pound of cheese.

What is claimed is:

1. A disassembleable container, the container comprising a plurality of sidewalls and a plurality of endwalls, each of said sidewalls and endwalls having an interior surface defining, in-part, a volume for containing a block of cheese, wherein the container has an interlock to secure one of the sidewalls to one of the endwalls, the container being characterized by a cross section being generally perpendicular to each of the interior surfaces, in the cross section, the interlock comprising (i.) a first portion of either the one of the sidewalls or the one of the endwalls, the first portion of the one of the sidewalls or the one of the endwalls wrapping around a corner disposed where the interior surface of the one of the sidewalls and the interior surface of the one of the endwalls meet, and (ii.) a second portion of the other of the one of the sidewalls or the one of the endwalls disposed exterior to an exterior-facing surface of the first portion.

2. The disassembleable container, as claimed in claim 1, wherein the first portion and the second portion are L-shaped.

3. The disassembleable container of claim 1, wherein the second portion wraps around the corner.

4. The disassembleable container of claim 1, wherein the second portion is in contact with the exterior-facing surface of the first portion.

5. The disassembleable container of claim 4, wherein the second portion of the wraps around the corner.

6. A disassembleable container usable for making, storing or transporting cheese, the container comprising: a plurality of sidewalls; a plurality of endwalls, the plurality of sidewalls and the plurality of endwalls forming a hoop; a pressboard; and a lid, wherein the pressboard can be recessed, in whole or in part, in the lid such that a top surface of the pressboard can travel above a top of the hoop and a bottom surface of the pressboard can travel to a top of the hoop.

7. The disassembleable container, as claimed in claim 6, wherein the pressboard recessed in the lid of the container permits the container to be filled with more volume of contents than it would have available if the pressboard could not be recessed in the lid.

* * * * *